United States Patent Office 3,167,387
Patented Jan. 26, 1965

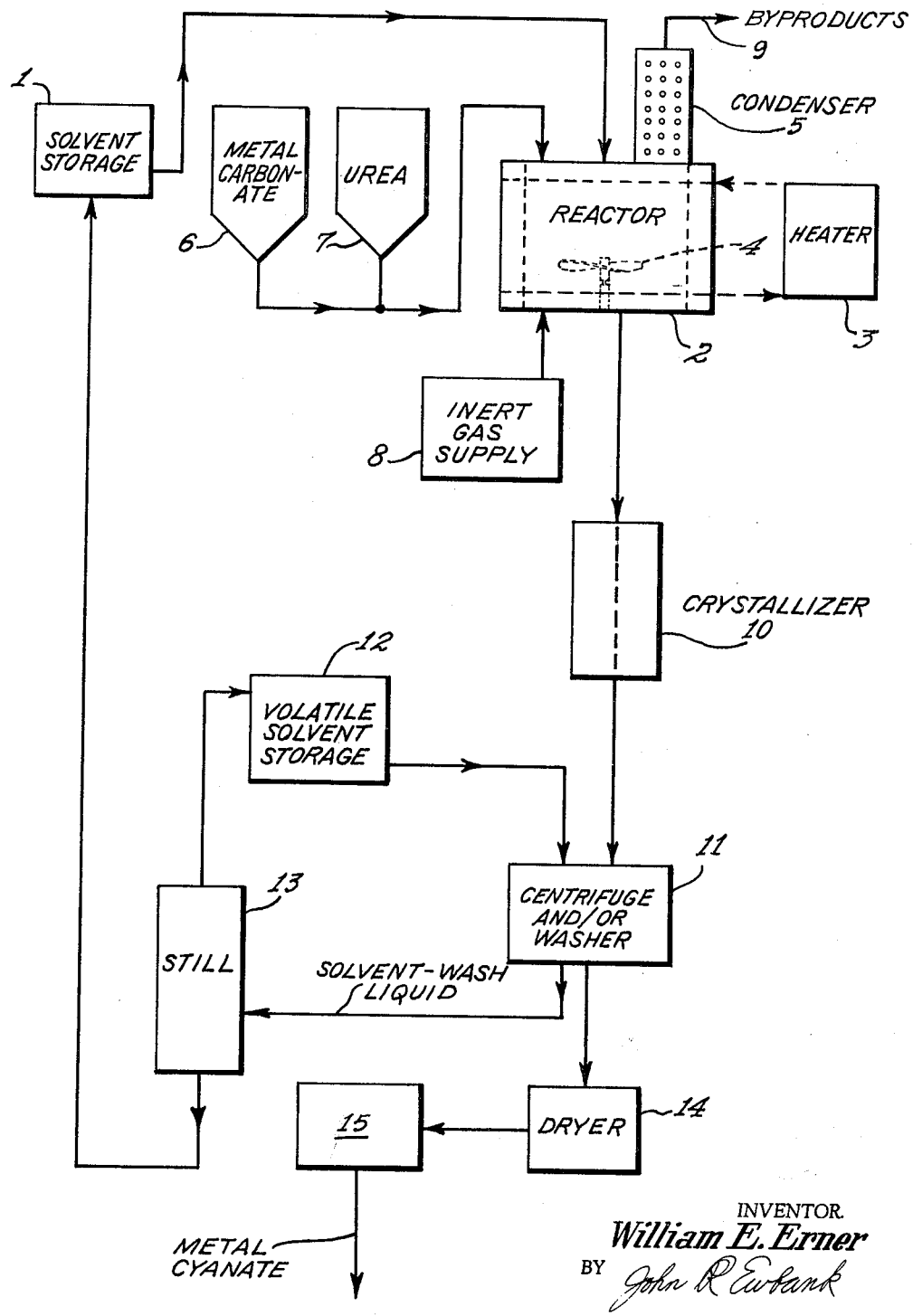

3,167,387
PROCESS FOR THE PRODUCTION OF ALKALINE CYANATES IN SULFOXIDE AND SULFONE SOLVENTS
William E. Erner, Brandywine Hundred, Del., assignor to Air Products and Chemicals, Inc., Philadelphia, Pa., a corporation of Delaware
Filed Aug. 29, 1963, Ser. No. 305,333
4 Claims. (Cl. 23—75)

The present invention is directed to the synthesis of alkali metal and alkaline earth metal cyanates from carbonates and urea by a low temperature process which avoids the conventional high temperature fusion technique.

Metal cyanates are prepared in current practice by a number of processes. In one method oxidizing agents such as oxygen, air, peroxides, $PbO_2$, etc., convert metal cyanides to the cyanates. In another method, metal cyanides are converted to cyanates by electrolysis in caustic solution. However, because cyanates undergo hydrolysis in hot aqueous solution, the isolation of pure cyanates is difficult. One of the widely practiced commercial syntheses is carried out by fusion of metal carbonates and urea at about 550 to 600° C. Reference is made to U.S. Patent No. 1,915,425 for a description of a method involving such fusion of alkali carbonate and urea. However, it is difficult to obtain carbonate-free melts of metal cyanates even by this process. Furthermore, under high temperature fusion conditions, the principal cyanate product changes to carbonate or cyanide and ammonia. Samples of commercial potassium and sodium cyanate made by the fusion process have a carbonate content varying from a trace quantity to a predominance of carbonate. Moreover, the cost of producing alkali cyanates by the fusion process has been great enough that there has been a continuing demand for an inexpensive method of making alkali cyanates.

In contrast to this high temperature fusion process, the process of the present invention provides a simple and effective means for the production of alkali metal and alkaline earth metal cyanates at substantially lower costs.

An object of the present invention is the low temperature synthesis of alkali and alkaline earth metal cyanates from the corresponding carbonates and urea wherein the reactants are in solution and the reaction is effected without fusion of the reactants.

A further object of the present invention is the synthesis of alkali and alkaline earth metal cyanates in the presence of an inert liquid which acts as a mutual solvent and heat transfer agent.

Yet a further object of the invention is the preparation of alkali metal cyanates in an economical manner not heretofore realized.

These and other objectives, as are discernible from the following specification, are accomplished in the following manner:

In accordance with the present invention, alkali metal and alkaline earth metal cyanates are synthesized by dissolving the corresponding metal carbonates and urea in a non-aqueous solvent having a high solvency for the carbonate and urea, not dissociated under the conditions of the reaction and inert to the reactants, heating the solution to a temperature above about 80° C. and generally no higher than about 250° C. to accelerate the reaction and to remove volatile byproducts formed in the reaction, and then cooling to approximately room temperature or below to effect the precipitation of substantially pure metal cyanate from the solvent for said synthesis.

More specifically, the alkali metal or alkaline earth metal carbonate is reacted at temperatures in the range of 80° to about 250° C. with urea in an inert mutual solvent especially selected as having a high solvency for the metal carbonate and urea at reaction temperature but having very slight solvency for the alkali metal cyanate at ordinary temperatures. An exceptionally satisfactory solvent medium for such a process is dimethyl sulfoxide which boils at 189° C. and has unusually high solvency for alkali and alkaline earth metal carbonates, is stable under the conditions of reaction and inert to both the reactants and the reaction product. The reaction may be further promoted by sparging an inert gas such as nitrogen through the reaction mixture to facilitate the removal of water vapor and other volatiles formed in the reaction.

The process of the invention is particularly unique in effecting the synthesis of alkali metal and alkaline earth metal cyanates at temperatures significantly lower than the temperature of fusion of the corresponding metal cyanate or of a reaction product consisting principally of metal cyanate.

In a typical operation in accordance with the invention, as in the synthesis of sodium cyanate, one molar equivalent of sodium carbonate and at least two molar equivalents of urea are dissolved in dimethyl sulfoxide in a ratio of from about 3 to about 10 parts by weight of dimethyl sulfoxide per part of total reactants, with warming and stirring. As the reaction proceeds, ammonia, carbon dioxide and water vapor are released. These are removed overhead preferably in a stream of inert gas, such as nitrogen. The temperature is raised to approximately the boiling point of the solvent, i.e., 189° C. for dimethyl sulfoxide, and held for about 15 minutes until ammonia evolution ceases. The solution is then cooled and sodium cyanate precipitated. The resultant slurry is filtered or centrifuged and the product crystals washed with a volatile liquid (e.g., low boiling organic halide, hydrocarbon, or absolute alcohol) and then dried. The product is generally recovered in at least 90% of theoretical yield and of high purity, as evidenced by a negative test for carbonate.

The synthesis is visualized by the following equation of the reaction:

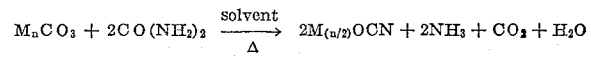

$$M_nCO_3 + 2CO(NH_2)_2 \xrightarrow[\Delta]{\text{solvent}} 2M_{(n/2)}OCN + 2NH_3 + CO_2 + H_2O$$

wherein, if M is an alkali metal, $n$ has a value of 2, as in lithium, sodium, potassium, rubidium or caesium carbonate, or wherein, if M is an alkaline earth metal, $n$ has a value of 1, as in beryllium, magnesium, strontium and calcium, whose carbonate salts are appreciably soluble in a stable solvent, which is preferably dimethyl sulfoxide, but may conceivably be a similar, stable, inert, relatively volatile liquid such as methyl ethyl sulfoxide, diethyl sulfoxide, tetramethylene sulfoxide, dimethyl sulfone, methyl ethyl sulfone, diethyl sulfone and thiophane sulfone boiling in the range of from 80° C. to about 250° C. having an appreciable solvency for metal carbonates and urea at temperatures preferably in the range of 100° C. to about 200° C. and slight solvency for cyanates at ordinary temperatures and unreactive in the system. All the named solvents correspond to the formula $C_{4-x}H_ySO_z$ in which the $C_{4-x}H_y$ is provided by possibilities such as tetramethylene —$CH_2CH=CHCH_2$-dimethyl, diethyl, and methyl ethyl, and in which formula the $x$ is an integer less than 3 (that is from 0, 1, or 2), the $y$ is from 6 to 10 and the $z$ is either 1 or 2.

In the accompanying drawing, which is representative of a flow sheet for the process, solvent (e.g., dimethyl sulfoxide) is charged from solvent storage tank 1 to the reactor 2 equipped with heating, stirring and condensing apparatus 3, 4 and 5 respectively. A metal carbonate from storage bin 6 and urea from storage bin 7 are charged to the reactor. An inert gas such as nitrogen from supply 8 is, preferably, sparged through the reactor to assist in the flow of byproducts consisting mainly of ammonia, carbon dioxide and water vapor through condenser 5 and byproducts discharge line 9. Heating and stirring are continued to a temperature of about 185° C. After ammonia evolution ceases, heating is discontinued. The reaction product in solution is transferred to and cooled in crystallizer 10 and the metal cyanate slurry separated (e.g., by centrifuge) and washed with inert, volatile, non-aqueous liquor (e.g., dichloromethane) utilizing suitable apparatus 11. The volatile liquor is supplied from storage tank 12. The reaction solvent and volatile wash liquor (e.g., dimethyl sulfoxide and dichloromethane respectively) in the filtrate are separated by distillation in the solvent recovery still 13 and recycled to storage tanks 1 and 12 respectively. The product is dried in drier 14 and packaged in weigh and drum station 15.

The drawing can be interpreted in conjunction with the description of the preparation of alkali metal and alkaline earth metal cyanates in the following examples:

*Example I*

26.5 parts by wt., 25 moles of sodium carbonate and
35 parts by wt., 58 moles of urea were dissolved in
220 parts by wt., 20 liters, of dimethyl sulfoxide in a ceramic lined reaction kettle and reacted with gradual heating and stirring A moderate stream of nitrogen gas was passed through the mass simultaneously. On reaching a temperature of about 160° C. water vapor began to distill over and at 185° C. a constant boiling mixture of water and dimethyl sulfoxide distilled over. Within a few minutes of reaching 185° C. ammonia evolution ceased; heating was terminated, the distillation was stopped and the mixture cooled. On cooling to ambient temperature, the sodium cyanate separated as a white crystalline solid, which on filtering, washing with one liter of dichloromethane and drying amounted to 31 parts by weight of sodium cyanate (equivalent to 48 moles), or 95% of the theoretical yield. The product was carbonate-free by barium nitrate tests, giving at the most a slight opalescence from precipitated barium carbonate. By the cobalt nitrate test the product gave the deep blue color of the cyanate complex.

*Example II*

In a manner similar to Example I above,
690 parts by weight, 5.0 moles of ground anhydrous potassium carbonate and
780 parts by weight, 13.0 moles of urea dissolved in
4400 parts by weight, 4.0 liters, of methyl ethyl sulfoxide The liquid reaction mass is heated and stirred while nitrogen gas is passed gently therethrough. Within one hour the temperature is brought up to 180° C. with water vapor coming off along with both ammonia and $CO_2$. After about ¼ hour and at a temperature of 195° C. a sample taken from the reaction product gives a negligible test for carbonate by the barium nitrate test. Heating is terminated at this point and the mass cooled to room temperature. Crude crystallized potassium cyanate (approximately 750 parts by weight, 94% of theoretical yield) is separated by filtration. After slurrying and washing the crude crystals with three successive 0.2 liter amounts of absolute alcohol, the potassium cyanate product is 710 parts by weight, or 90% of theoretical yield.

*Example III*

8.4 parts by weight of magnesium carbonate
12.5 parts by weight of urea are dissolved slowly in
210 parts by weight of dimethyl sulfone with heating and stirring. At a temperature above 130° C., water vapor, $CO_2$ and ammonia are released as the reaction mass effervesces. A stream of gaseous $CO_2$ from an external source is passed through the reaction mass until, at 188° C. no more ammonia is released. On cooling, white flaky magnesium cyanate precipitates from the solution; it is filtered off, washed with
25 parts by weight of pentane, dried and weighed. The magnesium cyanate product is
9.8 parts by weight, or 91 weight percent of theoretical yield Barium nitrate gives a carbonate-free test.

In the above examples it has been shown that a low temperature cyanate process is entirely feasible by the use of a selected solvent, thus avoiding the difficulties of the time and temperature sensitive fusion process. While the reaction is preferably carried out with anhydrous metal carbonates, the process can tolerate small amounts of water in the reactants and operates to remove such water as well as water formed in the reaction from the reaction system and the product. Thus, lower cost carbonates and urea containing water as an impurity can be used satisfactorily.

While reaction temperatures in the range of 100 to 200° C. have been generally preferred, this is an operating condition which can be varied with the solvent used. Dimethyl sulfoxide boiling at 189° C. is exceptionally well suited to the process for the synthesis of sodium and potassium cyanate. However, other stable polar organic compounds having high solvency for metal carbonates and covering a moderately broader boiling range of the order of 80 to 250° C., such as dimethyl sulfone, diethyl sulfoxide, and tetramethylene sulfoxide can be used, provided that the solvent is stable and unreactive with the reactants under the conditions of operation, which, in any event, will be substantially below the 500 to 600° C. temperature of fusion of the expected alkali metal or alkaline earth metal cyanates, or a reaction product consisting principally of the expected metal cyanates.

The examples, as described above made use of gaseous nitrogen or $CO_2$ sparged through the reaction mass to facilitate the removal of water from the system. While such operation is beneficial in maintaining an anhydrous condition in the reactor and thus assuring high yields of practically carbonate-free metal cyanate, it is not critical for the success of the process. The reaction itself releases two moles of ammonia, one mole of carbon dioxide and one mole of water (vapor) per mole of metal carbonate reacting, so that a regular effervescence is noted as the synthesis proceeds. Also, other gases unreactive under operating conditions can be used in the place of nitrogen and $CO_2$, such as additional gaseous ammonia, flue gas ($CO_2$ and $N_2$), hydrogen, helium or argon.

Alkali metal and alkaline earth metal cyanates, as the salts of cyanic acid, have found many uses in industry and particularly in organic synthesis. For example, potassium cyanate and dialkyl sulfates may be reacted to form isocyanates:

$$2KOCN + R_2SO_4 \rightarrow 2RNCO + K_2SO_4$$

which can provide selected alkyl isocyanates for urethane synthesis.

The process of the instant invention is, furthermore, of specific interest in that the metal cyanates formed in the presence of an excess of dimethyl sulfoxide, for example, the total reaction product of the above process, can be used directly in the synthesis of selected alkyl or alkenyl substituted urethanes. With warming, the metal cyanate in dimethyl sulfoxide solution is reacted with an alkyl or alkenyl halide and an alcohol to form alkyl alkenyl urethanes in high purity an excellent yield. Moreover, the derived alkyl alkenyl urethane reaction product, which is readily freed of insoluble metal salts, still in the presence of a major proportion of dimethyl sulfoxide, can be co-polymerized directly with polymerizable chain extending monomers, such as vinyl acetate, and polymerizable plasticizer-type compounds, such as dibutyl maleate, in the presence of polymerization catalysts, such as azobisisobutyronitrile, to form viscous oily polymers useful as foam stabilizers in foamed polyurethanes.

Lithium, potassium and related cyanates are used extensively in glass making and the ceramic arts as well as in producing protective coatings on metals. Metal and organic cyanates have, furthermore, been used extensively as herbicides in weed control, as fertilizers, insecticides and as agents to control methane conversion of distillery wastes.

Obviously many modifications and variations of the invention as hereinabove set forth may be made without departing from the spirit and scope of the invention, and therefore, only such limitations should be imposed as are indicated in the appended claims.

What is claimed is:

1. The method of synthesizing a metal cyanate selected from the group consisting of lithium, sodium, potassium, rubidium, caesium, beryllium, magnesium, calcium and strontium cyanate from the corresponding metal carbonates and urea which comprises:
   (a) reacting at a temperature in the range from about 80° C. to about 250° C. a solution of the metal carbonate and urea dissolved in a solvent selected from the group consisting of dimethyl sulfoxide, methyl ethyl sulfoxide, and dimethyl sulfone;
   (b) removing volatile byproducts formed during the approximately fifteen minutes of such reaction; and
   (c) cooling, crystallizing and recovering the resulting metal cyanate.

2. The method as set forth in claim 1, wherein the heated reactants are purged of water vapor and volatile byproducts by sparging a non-reactive gas through the reaction system.

3. The method as set forth in claim 1, wherein the recovered metal cyanate is washed with a volatilizable, non-reactive liquid of the group consisting of hydrocarbons, halogenated hydrocarbons and alcohols.

4. The method of synthesizing sodium cyanate from sodium carbonate and urea which comprises heating and stirring a dimethyl sulfoxide solution of sodium carbonate and urea at a temperature of about 185° C. until ammonia evolution ceases; thereafter cooling the solution to recover sodium cyanate; and washing the sodium cyanate with a volatile liquid of the group consisting of pentane, dichloromethane, and absolute alcohol.

References Cited in the file of this patent

UNITED STATES PATENTS

| 1,915,425 | Kloepfer | June 27, 1933 |
| 2,699,418 | Ter Horst | Jan. 11, 1955 |
| 2,729,541 | De Pree et al. | Jan. 3, 1956 |
| 2,889,198 | Barrett et al. | June 2, 1959 |

FOREIGN PATENTS

| 354,604 | Great Britain | Aug. 13, 1931 |

OTHER REFERENCES

"The Condensed Chemical Dictionary," 6th Edition, page 399, Reinhold Pub. Corp., New York, 1961. Q.D.5, C5, 1961, C. 17.

"Potassium Cyanate" article in "Cyanamid New Product Bulletin," Collective Volume I (Revised Edition), published by American Cyanamid Co., 30 Rockefeller Plaza, New York 20, N.Y., October 1952, page 130.